(12) United States Patent
Tatum et al.

(10) Patent No.: US 7,088,518 B2
(45) Date of Patent: Aug. 8, 2006

(54) BIDIRECTIONAL OPTICAL DEVICE

(75) Inventors: Jimmy A. Tatum, Plano, TX (US); James K. Guenter, Garland, TX (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/308,308

(22) Filed: Dec. 3, 2002

(65) Prior Publication Data

US 2004/0105161 A1 Jun. 3, 2004

(51) Int. Cl.
*G02B 27/14* (2006.01)
*G02B 27/10* (2006.01)
*G02B 6/32* (2006.01)
*G02B 6/36* (2006.01)
*H04B 10/00* (2006.01)

(52) U.S. Cl. ............... 359/634; 359/629; 359/618; 359/589; 359/722; 398/67; 398/41; 398/135; 398/138; 398/139; 398/156; 398/185; 385/31; 385/37; 385/35; 385/47; 385/88; 385/92

(58) Field of Classification Search ............... 359/634, 359/629, 618, 237, 238, 589, 722, 723; 385/14, 385/31, 35, 37, 47, 49, 88, 92, 93; 398/67, 398/68, 86, 135, 138, 139, 140, 156, 200
See application file for complete search history.

(56) References Cited

U.S. PATENT DOCUMENTS

| | | | | |
|---|---|---|---|---|
| 4,767,171 A | * | 8/1988 | Keil et al. .................. 385/35 |
| 5,272,555 A | * | 12/1993 | Suzuki ....................... 398/41 |
| 5,355,239 A | * | 10/1994 | Nakajima ................... 398/138 |
| 5,384,651 A | * | 1/1995 | Van de Voorde et al. ... 398/185 |
| 5,552,918 A | * | 9/1996 | Krug et al. ................. 398/139 |
| 5,631,757 A | * | 5/1997 | Bodeep et al. .............. 398/138 |
| 5,796,899 A | * | 8/1998 | Butrie et al. ................. 385/92 |
| 5,838,859 A | * | 11/1998 | Butrie et al. ................. 385/92 |
| 5,909,294 A | * | 6/1999 | Doerr et al. ................ 398/138 |
| 6,075,635 A | * | 6/2000 | Butrie et al. ................ 398/139 |
| 6,188,494 B1 | * | 2/2001 | Minteer ..................... 398/135 |
| 6,201,908 B1 | | 3/2001 | Grann ......................... 385/24 |
| 6,252,719 B1 | * | 6/2001 | Eichenbaum ............... 359/634 |
| 6,396,978 B1 | | 5/2002 | Grann ......................... 385/24 |
| 6,456,757 B1 | | 9/2002 | Kim et al. ................... 385/24 |
| 6,493,121 B1 | * | 12/2002 | Althaus ..................... 398/135 |
| 6,627,867 B1 | * | 9/2003 | Ames et al. ............ 250/214 R |
| 6,763,195 B1 | * | 7/2004 | Willebrand et al. ......... 398/115 |
| 6,889,010 B1 | * | 5/2005 | Trezza ........................ 398/130 |
| 6,898,378 B1 | * | 5/2005 | Nelson et al. .............. 398/138 |
| 6,920,289 B1 | * | 7/2005 | Zimmerman ................ 398/118 |
| 2003/0152336 A1 | * | 8/2003 | Gurevich et al. ............. 385/88 |

OTHER PUBLICATIONS

Blaze Network Products—Company Overview, http://www.blazenp.com/technology/index.html, pp. 1-2, Nov. 4, 2002.

* cited by examiner

*Primary Examiner*—Loha Ben
(74) *Attorney, Agent, or Firm*—Workman Nydegger

(57) ABSTRACT

A multiband wavelength multiplexed optical device for bidirectional communication over one light path. The device may use dichroic filters or reflectors, or other mechanisms for wavelength or bandwidth separation or discrimination of sent or received light signals. It may have a multitude of light sources and detectors for sending and receiving light signals such as those for optical-based communications, controls and so forth. For instance, the optical device may be utilized in transceiver systems.

26 Claims, 4 Drawing Sheets

BIDIRECTIONAL OPTICAL DEVICE

BACKGROUND

The invention relates to optical communication and more particularly to bidirectional communication on an optical link or network. Such optical communications are becoming more significant in the communications field. New standards may be emerging relating to such communication.

SUMMARY

The invention is an optical assembly or sub-assembly that may easily couple light of one wavelength to a single light wave guide and receive light of the same wavelength or another wavelength from the same waveguide at the same time. The assembly includes opto-electronic components for emitting and detecting light signals to and from the wave guide, in a form factor that is compatible with typical two-fiber receiver assemblies.

DESCRIPTION

Figure 1:
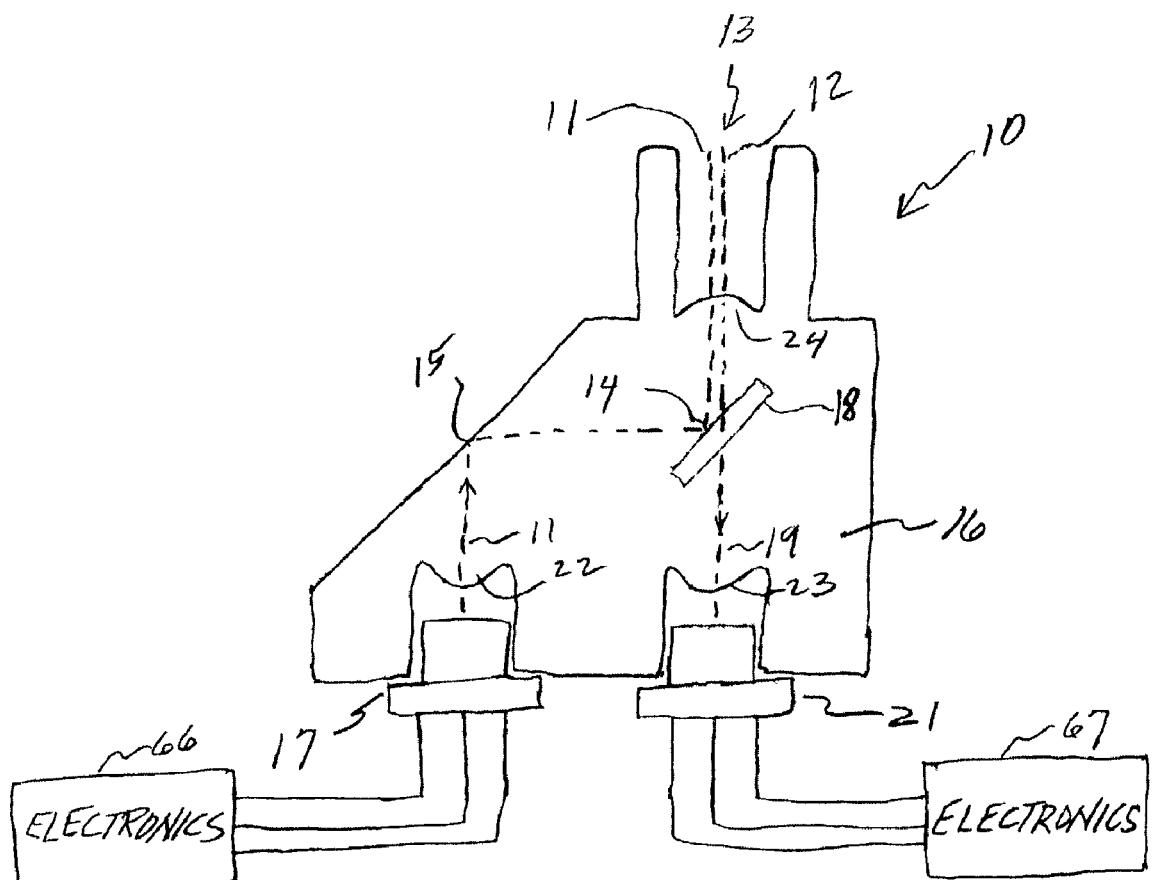
FIG. 1 reveals a bidirectional multiband optical device using a wavelength filter.

FIG. 1 is a basic diagram of a bidirectional multiband optical assembly 10. Light 11 of a first wavelength may be emitted by light source 17, which may be reflected at points 15 and 14 and exit optical port 13. Light source 17 may be a VCSEL outputting light 11 that may modulated in one form or another with communication signals or the like. These functions may be accomplished with an electronics module 66 that is connected to source 17. Source 17 may be another kind of device as appropriate for an application of the assembly. Light 11 may have other wavelengths, besides the first wavelength, which may be filtered out by a filter or mirror. Points 15 and 14 are where light is reflected and may be mirrors that are discrete or integrated parts of structure 16, such as an internal reflecting surface in the structure, or a reflective filter. Point 14 may be where filter 18 is reflective of a particular wavelength. Filter 18 may allow light 19 to pass through it to optical port 13. Light 12 may enter optical port 13 and go through a wavelength filter 18. Filter 18 may be a dichroic filter that reflects one or more wavelengths and transmits others. Filter 18 may be designed to pass light 19 of a second wavelength. All other wavelengths of light 12 are not transmitted through filter 18. Light 19 of the second wavelength may be detected by a detector 21 and converted into electrical signals. Light 19 may be modulated. Detector 21 along with an electronics module 67 may demodulate such light. Detector 21 may be a photo detector or another kind of device as appropriate for an application of the assembly. Light signals may be sent and received by device 10 simultaneously. On the other hand, components 17 and 21 may both be detectors or sources and receive or send, respectively, various signals simultaneously on different wavelengths of light, or on the same wavelength. Device 17 and/or 21 may both be a source and a detector.

Source 17 and detector 21 may be enclosed within a standard TO can (e.g., TO-5 or TO-18) as optical components. These components may electronically and packaging-wise have interfaces to standard PCBs for SFP modules. These components may have other forms of packaging. Alternatively, components 17 and 21 may be integral parts of structure 16. Lenses 22 and 23 for light source 17 and detector 21, respectively, may be molded plastic parts. The lenses also may be parts integrated into structure 16 or be molded as part of the structure. Lenses 22 and 23 may instead be part of TO can components 17 and 21, or be situated on or monolithically be a part of the laser and detector chips. Lens 24 at optical port 13 may focus incoming light to a mirror, filter or detector in structure 16. It may also focus outgoing light to a light waveguide, such as a fiber, at optical port 13. Lens 24 may have the same structural characteristics as those of lenses 22 and 23. Lenses 22, 23 and 24 may also be use to collimate light.

Structure 16 may be a molded plastic part, made from a material such as Ultem$^R$, or it may be an injection molded metal part or other metal housing. Structure 16 also may be made from a composite material. The TO can optical components 17 and 21 may be attached to the plastic or metal structure 16 with an epoxy or laser welding, respectively. These components are alignment tolerant. Metal rings may be attached to a plastic structure 16 for laser welding metal components to it. Dichroic filter 18 or mirror may be placed in a molded indent formed within plastic or metal structure 16 and glued in place or it may be inserted and held in place by compression. A molded groove in structure 16 may provide appropriate alignment of dichroic filter 18. Alternatively, structure 16 may be composed of two pieces glued together, one or both of which may have dichroic reflectors deposited on their surfaces.

Figure 2:
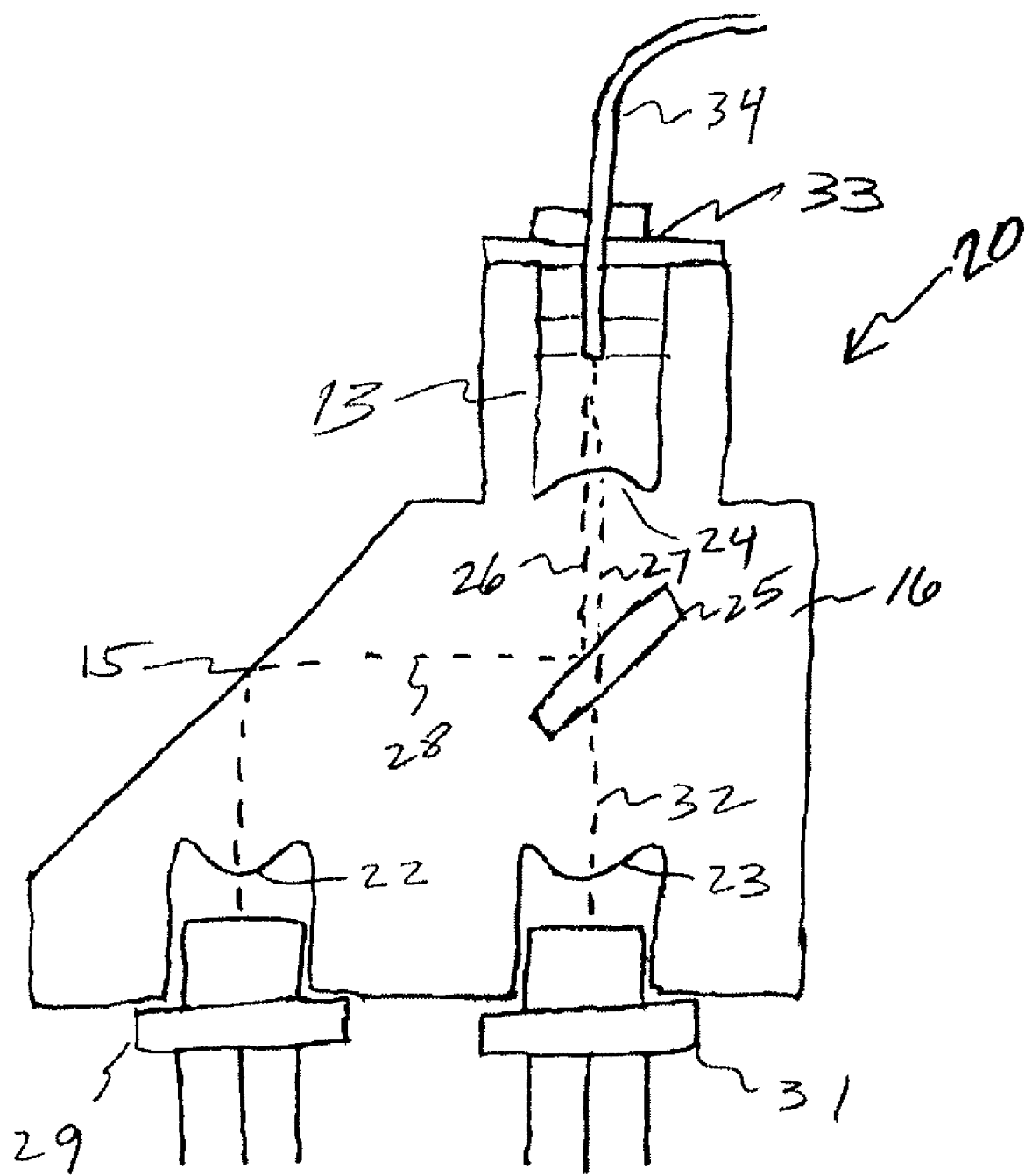
FIG. 2 shows a bidirectional multiband optical device using a wavelength reflector.

FIG. 2 shows an optical assembly 20. Structure 16 of assembly 20 is like that of assembly 10. Instead of a filter 18, a reflector 25, such as dichroic mirror, may be used. Light 26 may enter and strike reflector 25. Reflector 25 may reflect only light 28 of a third wavelength, as an illustrative example, from light 26, which has other wavelengths as well, entering optical port 13. The remaining light with the other wavelengths may pass through reflector 25. Light 28 may be reflected by surface 15 of structure 16 to an optical component 29. Component 29 may be a photo detector that detects light 28, such as a charge coupled device (CCD), a photodiode, a resonant cavity photo detector (RCPD), an avalanche photodiode (APD), or another kind of light detector. Optical component 31 may emit light 32 having a fourth wavelength. Some of light 32 may go through dichroic mirror 25, including light having the fourth wavelength. Component 31 may be a laser, vertical cavity surface emitting laser (VCSEL), a light emitting diode (LED), or another kind of light emitter. Light signals 32 and 28 may be sent and received by the components of device 20, simultaneously. On the other hand, components 29 and 31 may both be detectors or sources that receive or send simultaneously various light signals having different wavelengths.

Device 20 may also have an optical fiber ferrule receptacle 33 for optical connection and for physically securing an optical fiber 34 to structure 16. Fiber ferrule receptacle 33 may be molded in with metal, plastic or ceramic, or be aligned and attached as a subassembly of structure 16. Active two-axis alignment capabilities may be provided by receptacle 33 for optically connecting fiber 34 or another light conveying mechanism to device 20. Another kind of receptacle may be implemented for optically and physically connecting other kinds of light conveying mechanisms to structure 16.

Figure 3:
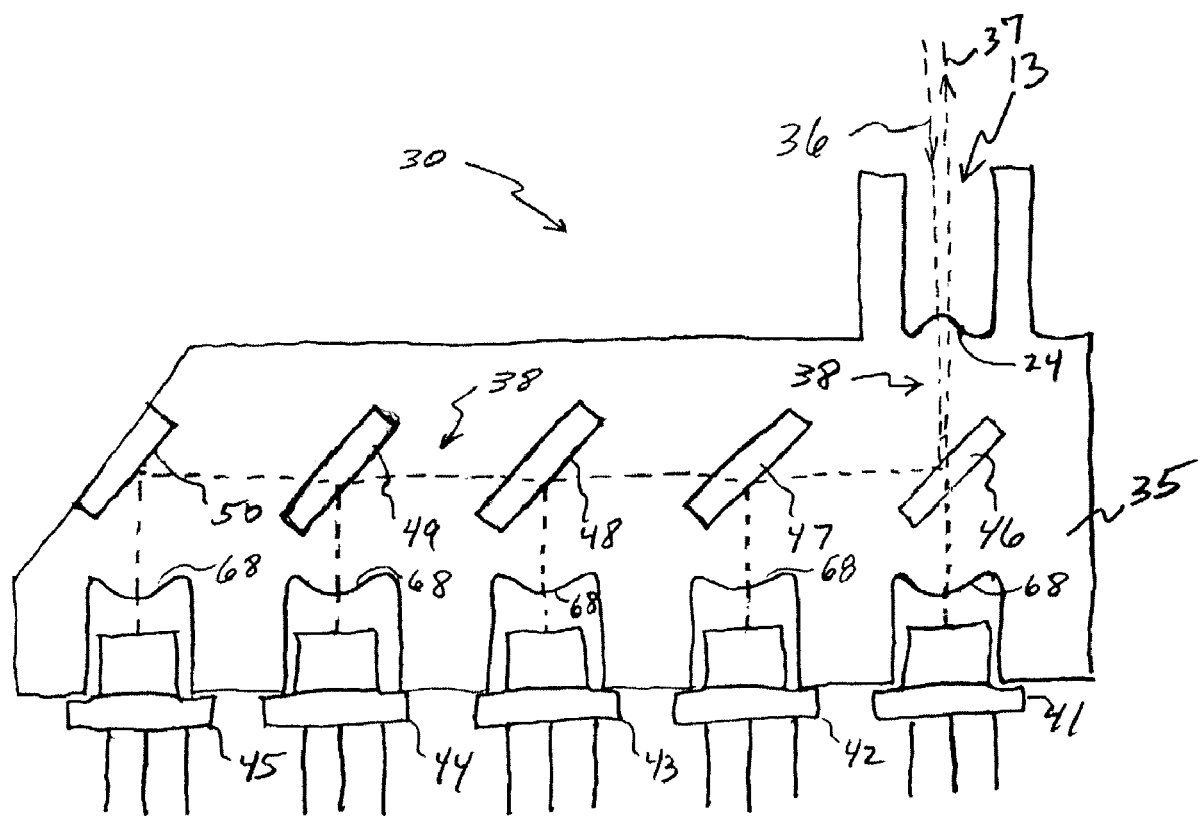
FIG. 3 illustrates a multiple wavelength or bandwidth bidirectional optical device having multiple components utilizing wavelength or bandwidth discriminators.

FIG. 3 shows a bidirectional optical device 30 having a multitude of optical components, such as just detectors or sources, or a mix of detectors and sources. The number of optical components is arbitrary, and may be determined by the application of device 30. Device 30 reveals five optical components 41, 42, 43, 44 and 45, as an illustrative example of a structure 35. Light 36 may arrive through port 13 and light 37 may exit port 13. Light 36 received may have a multitude of wavelengths, each wavelength having communication signals different from those of other wavelengths. Similarly, light 37 sent out may have a multitude of wavelengths, each wavelength having communication signals different from those of other wavelengths. Light 36 and light 37 may be conveyed to and from optical components 41, 42, 43, 44 and 45 by an optical mechanism 38. Mechanism 38 may be a light waveguide, an optical fiber, a series of mirrors, or other items to accomplish the conveyance of light 36 and 37 to and from the optical components. Or mechanism 38 might not be utilized. Lenses 24 and 68 may be used to focus or collimate light as appropriate. The lenses may be an integral part of structure 35. Light 36 and light 37 to or from optical components 41, 42, 43, 44 and 45 may go through filters, for example, dichroic filters 46, 47, 48, 49 and 50, respectively. In other words, if each optical component has a wavelength different from the other optical components, there may be a filter of that wavelength associated with the respective component. For instance, optical component 41 may send or receive light signals if a first wavelength or bandwidth; optical component 42 may send or receive light signals of a second wavelength or bandwidth; optical component 43 may send or receive light signals of a third wavelength or bandwidth; optical component 44 may send or receive light signals of a fourth wavelength or bandwidth; and optical component 45 may send or receive light signals of a fifth wavelength or bandwidth. Similarly, filter 46 may transmit or pass light signals only of a first wavelength or bandwidth; filter 47 may transmit light only of a second wavelength or bandwidth; filter 48 may transmit light of only a third wavelength or bandwidth; filter 49 may transmit light of only a fourth wavelength or bandwidth; and filter 50 may transmit light of only a fifth wavelength or bandwidth. All of optical components 41, 42, 43, 44 and 45 may send light signals 37 and/or receive light signals 36 at the same time.

Filters 46, 47, 48, 49 and 50 may be replaced with, for example, dichroic reflectors or other wavelength or bandwidth discriminating mechanisms. With such replacements, the optics may be adjusted for conveying light signals 36 and 37 to and from optical components 41, 42, 43, 44 and 45.

Structure 35 may be made from molded plastic, for example, Ultem$^R$, metal, composite materials or other suitable materials. Structure 35 may have similar features as those of structures 10 and 20 in FIGS. 1 and 2.

Figure 4:
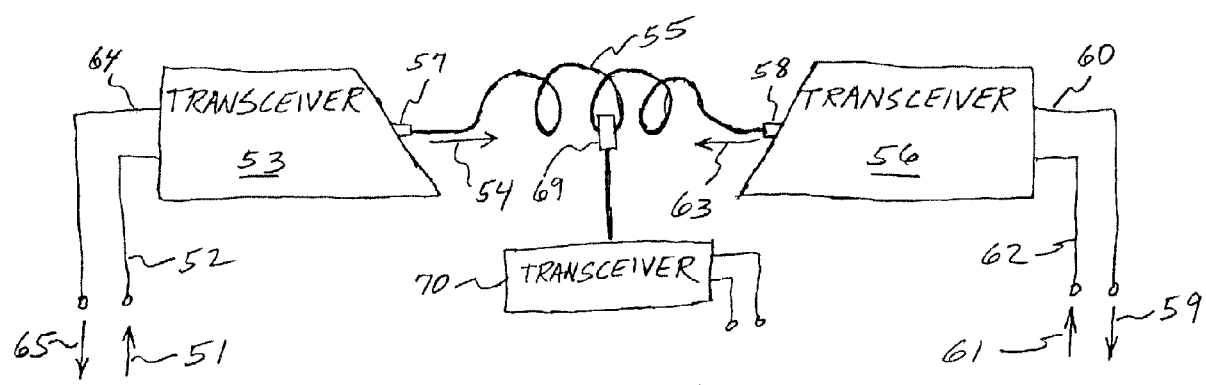
FIG. 4 shows an electrical/optical transceiver signal system.

One application of use of the invention as described in this specification is shown in FIG. 4. An electrical signal 51 may enter input 52 of a transceiver 53 where signal 51 is converted to an optical signal 54. Optical signal 54 is output through an optical port 57 by transceiver 53. Optical signal 54 traverses through an optical fiber 55 to an optical port 58 of transceiver 56. Transceiver 56 converts optical signal 54 to an electrical signal 59 which comes out of transceiver 56 on an output 60. In the other direction, an electrical signal 61 may enter input 62 of transceiver 56 where signal 61 is converted to an optical signal 63. Optical signal 63 is output through optical port 58 of transceiver 56 to optical fiber 55. Optical signal traverses through optical fiber 55 and enters transceiver 53 through optical port 57. Optical signal 63 is converted to an electrical signal 65 by transceiver 53. Signal 65 comes from transceiver 53 at output 64. The signals may be sent in both directions simultaneously. The optical signals may be of the same wavelength or different wavelengths. Wavelength-separation elements 69 may be introduced midspan in optical fiber 55, such that, for example, transceiver 53 may send an optical signal 54 to transceiver 56, but an optical signal 63 from transceiver 56 may be directed to a third transceiver 70 in a different location. The transceivers or sets of transceivers may be utilized in communications, controls and other applications.

Although the invention has been described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:
1. A bidirectional optical device comprising:
a first transceiver having an optical port, an electrical input and electrical output;
a second transceiver having an optical port, an electrical input and an electrical output; and
an optical medium connecting the optical port of said first transceiver to the optical port of said second transceiver wherein said optical medium comprises a waveguide.
2. The device of claim 1, wherein:
said first transceiver comprises:
  a wavelength splitter proximate to the optical port;
  a light source connected to the electrical input and proximate to said wavelength splitter; and
  detector connected to the electrical output and proximate to said wavelength splitter; and
said second transceiver comprises:
  a wavelength splitter proximate to the optical port;
  a light source connected to the electrical input and proximate to said wavelength splitter; and
  detector connected to the electrical output and proximate to said wavelength splitter.
3. The device of claim 2, wherein:
said wavelength splitter of said first transceiver may pass light having a first wavelength from said light source to the optical port of said first transceiver;
said wavelength splitter of said first transceiver may reflect light having a second wavelength from the optical port to said detector of said first transceiver;
said wavelength splitter of said second transceiver may pass light having the second wavelength from said light source to the optical port of said second transceiver; and
said wavelength splitter of said second transceiver may reflect light having the first wavelength from the optical port to said detector of said second transceiver.
4. The device of claim 1, further comprising:
a third transceiver having an optical port, an electrical input and electrical output, the optical medium connecting the optical port of the third transceiver to the optical ports of the first and second transceivers.
5. A bidirectional optical device comprising:
a first plurality of transceivers, wherein each transceiver has an optical port, an electrical input and an electrical output;

a second plurality of transceivers, wherein each transceiver has an optical port, an electrical input and an electrical output; and an optical medium connecting the optical ports of said first plurality of transceivers to the optical ports of said second plurality of transceivers, where certain optical ports of various transceivers may selectively be connected to certain optical ports of other various transceivers of said first and second pluralities of transceivers.

6. The device of claim 5, further comprising at least one wavelength separation element situated in said optical medium.

7. The device of claim 5, wherein said optical medium is a waveguide.

8. The device of claim 5, wherein said optical medium is a fiber.

9. The device of claim 5, wherein the optical medium is an ambient environment between the optical ports of said first and second pluralities of transceivers, respectively.

10. A bidirectional optical device comprising:

a transceiver configured for selective connectability to other transceivers, the transceiver having an electrical input, an electrical output, and an optical port configured to receive an optical medium such that the optical port can be connected through the optical medium to optical ports at the other transceivers;

a light source proximate to said optical port;

a light detector proximate to said optical port; and a wavelength splitter proximate to said optical port, the wavelength splitter configured to pass light having a first wavelength from said light source to said optical port and the wavelength splitter configured to pass light having a second wavelength from said optical port to said detector.

11. The device of claim 10, wherein the optical port comprises a fiber ferrule receptacle configured to receive a fiber optic cable.

12. The device of claim 10, wherein the light source, wavelength splitter, light detector are incorporated into the transceiver.

13. The device of claim 12, wherein the transceiver is comprised of at least one of: metal; and, plastic.

14. The device of claim 10, wherein the wavelength splitter comprises a wavelength splitter configured to pass light having the first wavelength to selectively connect the transceiver with a first one or more transceivers and is configured to pass light having the second wavelength to selectively connect the transceiver with a second different one or more transceivers.

15. A device for bidirectional wavelength multiplexing comprising:

a structure having a wavelength separator feature;

at least one optical component having a wavelength distinct from a wavelength of any other of the at least on one optical component, the at least one optical component being attached to the structure;

an optical wavelength separator mechanically coupled with the wavelength separator feature, the optical wavelength separator proximate to the at least one optical component; and an optical interface proximate to said optical wavelength separator, wherein the optical interface comprises an optical fiber ferrule receptacle for receiving an optical fiber such that the device can be selectively connected to other devices.

16. The device as recited in claim 15, wherein the at least one optical component comprises at least one of a light detector and a light source.

17. The device as recited in claim 15, wherein the at least one optical component comprises a plurality of optical components, each optical component of the plurality of optical components having a wavelength distinct from a wavelength of other optical components in the plurality of optical components, and the device further comprising a plurality of optical wavelength separators, each of which is located proximate to a respective optical component of the plurality of optical components, and each of which is configured to pass light of the distinct wavelength for the respective optical component.

18. The device as recited in claim 15, wherein the optical wavelength separator comprises at least one of a dichroic filter and a dichroic mirror.

19. The device as recited in claim 15, wherein the wavelength separator feature comprises an aligned groove.

20. The device as recited in claim 15, wherein the wavelength separator is affixed to an aligned groove of the structure.

21. A bidirectional optical device comprising:

a structure, including:
an electrical input;
an electrical output;
a wavelength separator feature; and
an optical port configured to connect to an optical medium;

a plurality of optical components configured for selective connectivity with other optical devices based on wavelength, including:

a laser connected to the electrical input and attached to the structure, the laser configured to send light to a connected optical medium at a first wavelength different from wavelengths of other optical components in the plurality of optical components; and an optical detector connected to the electrical output and attached to the structure, the optical detector configured to receive light from the connected optical medium at a second wavelength different from the wavelengths of other optical components in the plurality of optical components; and a wavelength separator mechanically coupled with the wavelength separator feature, the wavelength separator configured to separate light into the first wavelength for selective communication between the laser and other devices and configured to separate light into the second wavelength for selective communication between the optical detector and other different devices.

22. The device of claim 21, wherein the wavelength separator feature comprises an aligned groove.

23. The device of claim 21, wherein the wavelength separator is affixed to an aligned groove of the structure.

24. The device of claim 21, wherein the structure is comprised of at least one of: metal; and, plastic.

25. The device of claim 21, wherein the wavelength separator comprises at least one of a dichroic filter and a dichroic mirror.

26. The device of claim 21, wherein the optical port comprises a fiber ferrule receptacle configured to receive a fiber optic cable.

* * * * *